United States Patent [19]

Gerstenmeier et al.

[11] 4,192,180
[45] Mar. 11, 1980

[54] TESTING APPARATUS FOR AN ANTI-LOCK CONTROL SYSTEM

[75] Inventors: Jürgen Gerstenmeier, Waldhilsbach; Hermann Klotz, Schwetzingen; Heinz Leiber, Leimen, all of Fed. Rep. of Germany

[73] Assignee: Robert Bosch GmbH, Stuttgart, Fed. Rep. of Germany

[21] Appl. No.: 920,308

[22] Filed: Jun. 28, 1978

Related U.S. Application Data

[63] Continuation of Ser. No. 773,253, Mar. 1, 1977, abandoned.

[30] Foreign Application Priority Data

Mar. 24, 1976 [DE] Fed. Rep. of Germany ....... 2612471

[51] Int. Cl.² ............................................... G01L 5/28
[52] U.S. Cl. ......................................... 73/121; 303/92
[58] Field of Search ............... 73/432 R, 121; 303/92; 340/52 B

[56] References Cited

U.S. PATENT DOCUMENTS

| | | | |
|---|---|---|---|
| 3,806,202 | 4/1974 | Ochiai | 340/52 B X |
| 3,852,613 | 12/1974 | Wienecke | 303/92 |
| 3,907,380 | 9/1975 | Fleischer et al. | 303/92 |

*Primary Examiner*—Anthony V. Ciarlante
*Attorney, Agent, or Firm*—Edwin E. Greigg

[57] ABSTRACT

A testing apparatus for an anti-lock control system for vehicle brakes for testing the correct functioning of the control system. In one embodiment, the apparatus establishes a predetermined speed and compares this predetermined speed to the speed sensed by the sensing portion of the control system. When the predetermined speed is exceeded by the moving vehicle a testing apparatus is triggered which initiates a test procedure for the control system. The apparatus includes a switching device to insure that a test procedure is initiated only after the vehicle ignition switch is actuated. In another embodiment, the apparatus employs a temperature sensor and/or the control system output for initiating a test procedure, but not during a deceleration of the vehicle. In a further variant, two threshold levels are established, each of which must be encountered before the test procedure is initiated.

7 Claims, 2 Drawing Figures

TESTING APPARATUS FOR AN ANTI-LOCK CONTROL SYSTEM

This is a continuation of application Ser. No. 773,253, filed Mar. 1, 1977, now abandoned.

BACKGROUND OF THE INVENTION

The invention relates to a testing apparatus for an antilock control system, with which the system is tested to determine its correct functioning at the beginning of a trip using a test signal coupled into the control system.

Such a testing apparatus is known, for example, from German Pat. No. 1,755,741. The known system includes control valves and special switching devices for monitoring the control valves. Actuation of the engine ignition switch generates a signal which triggers an actuation of the control valves and this response of the thusly triggered valves is monitored by means of the special switching devices.

OBJECT AND SUMMARY OF THE INVENTION

It is an object of this invention to improve the known testing apparatus with respect to its susceptibility to spurious signals.

This object is achieved, according to the invention, by the provision of switching devices which respond and trigger the testing procedure when a given predetermined low velocity is reached by the vehicle or by one or several wheels of the vehicle.

The essence of this invention lies in the fact that the testing process is delayed from the normal starting time point to the initial take-off phase of the vehicle. The delay is done because of the attendant strong disturbances created during the normal starting time point. The velocity at which the test is triggered is, however, low and lies, for example, near 5 kilometers/hour. This delay in initiating the test process and the corresponding test time span is of interest, in particular, when not only the response of the valves, but also the functioning of the signal conditioning and of the logic are to be monitored. For this purpose a signal indicative of a certain given velocity variation including a certain velocity decrease and increase is conducted to a control. When functioning correctly, and on the basis of this signal variation, this control generates deceleration, acceleration, and/or slip-signals at certain time points, which signals then also actuate the valves via logic circuitry. The formation of all these signals at certain time points yields the desired indication.

A reference value is required for the slip-determination, and this reference value can be utilized as vehicle velocity. However, it is preferable that the signals representing the wheel velocities of several wheels be conducted to threshold value stages having a low threshold value (for example 5 kilometers/hour), and the outputs of these threshold value stages be conducted to an AND-gate whose output signal initiates the test; that is to say, that the test is initiated when the participating wheels (all the wheels are preferably included) reach a given predetermined velocity.

In order not to begin the test anew after each velocity decrease, means are provided, according to one configuration of the invention, which trigger the testing procedure only when the velocity first exceeds the threshold or predetermined velocity after the vehicle is initially set into operation. This can happen, for example, by means of a bistable element which is SET through the actuation of the vehicle ignition switch with the output signal of this bistable element then allowing the testing procedure to proceed. The bistable element is RESET at the end of the testing procedure. This bistable element, preferably, also switches a warning lamp ON, which lamp is consequently extinguished at the end of the test if no fault is detected. This warning lamp, preferably, serves also for the notification of the presence of a defect which is discovered in the operation of the apparatus by means of separate safety circuitry.

According to a further development of the invention, one can, in addition to triggering the testing procedure when a specific velocity is reached, also trigger the testing procedure by means of other criteria. Thus it is appropriate, for example, to permit the triggering of the testing procedure when, without any braking, a control signal is generated, that is to say, a valve is operated, or for anti-lock systems having a pump, when the pump is switched ON. One could also prepare for the start of a testing procedure when a further velocity threshold is exceeded. The testing procedure is then triggered, preferably, a definite time span after another, lower velocity threshold is reached during a velocity decrease. This time span ought to be chosen such that the vehicle is no longer in the control region of the anit-lock control system even during braking on a road having a loose subsurface with small $\mu$, thus therefore possessing a low velocity. One could also permit the triggering of the testing procedure by means of the passage through a given temperature level or temperature difference, in order to encompass temperature influences.

Care must be taken that the actual control is not confused by the testing procedure. Therefore a test is not triggered during the control process, and in particular during braking, during vehicular deceleration, or when the accelerator pedal is released. The above mentioned case involving the two velocity thresholds, wherein one does utilize the time span to arrive outside of the control region is the only exception.

Advantageously, no control valve is actuated during those supplementary tests, and the warning lamp is only switched ON when a defect develops.

DESCRIPTION OF THE PREFERRED EMBODIMENTS

Figure 1:
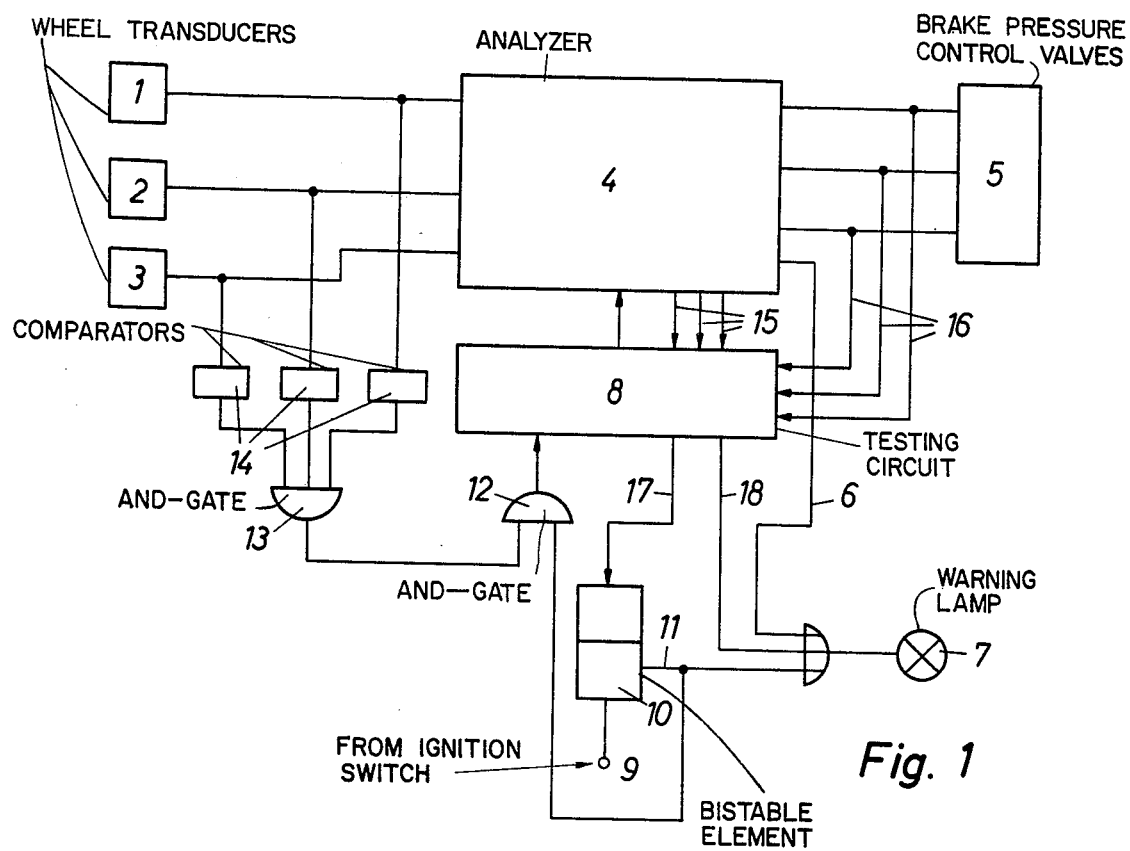
FIG. 1 is a block diagram of an exemplary embodiment of the invention.

FIG. 1 depicts three transducers 1, 2 and 3, of which one is assigned to each front wheel and one to the rear wheels of the vehicle. The signals from these transducers are conducted to an analyzer circuit 4, in which are formed, in a known manner, for example, wheel deceleration signals, wheel acceleration signals, and slip-signals from the signals conducted thereto. These signals are processed by logic circuits contained within the known analyzer circuit 4 into control signals for the brake pressure control valves collectively contained in the block 5. The arrangement described till now may be similar to these described in U.S. Pat. Nos. 3,754,797 and 3,832,008.

The analyzer circuit 4 additionally contains a safety circuit. The safety circuit monitors, for example, during the operation of the control, whether the brake control valves fail to respond for too long a time period; and which, when a valve does indeed respond for too long a time period, generates a signal in the line 6 which switches a warning lamp 7 ON. IN addition, the control is also turned OFF by means of the safety circuit (see e.g. U.S. Pat. No. 3,883,184).

Moreover, the control is tested for its functional proficiency at the beginning of each trip. The testing circuit 8 serves this purpose. Upon actuation of the vehicle ignition switch (not shown), a bistable element 10 is SET via a terminal 9, so that the warning lamp 7 is switched ON via an output 11 of the bistable element 10. This output signal of the bistable element 10 also serves to condition the AND-gate 12 in such a manner that when an output signal is formed at the AND-gate 13, that output signal can then reach the testing circuit 8. An output signal of the AND-gate 13 is formed when all the signals from the transducers 1, 2 and 3 exceed a predetermined value preset into comparator stages 14, for example, when all the signals correspond to a velocity magnitude greater than 5 kilometers/hour. This means that a triggering signal is generated at the input of the testing circuit 8 at this low take-off velocity, which triggering signal sets this testing circuit 8 into operation. Within a predetermined time span, the testing circuit 8 (which functions for example similar to that known from German Laid Open Specification No. 2,323,358=U.S. Pat. No. 3,907,380) thereupon couples a testing signal into the analyzer circuit 4. The formation of certain particular signals at certain particular time points during the course of this testing signal (the formation, for example, of slip-signals, deceleration signals, acceleration signals, value actuation signals) is reported back to the testing circuit 8 via the scanner lines 15 and 16, and is there tested for correctness. An output signal appears in the line 17 at the end of the testing cycle, which output signal RESETS the bistable element 10. When the signals scanned by the testing circuit 8 have been formed at the correct respective time points, no error signal is issued in the line 18. The warning lamp 7 then extinguishes at the end of the testing cycle through the RESETTING of the bistable element 10. The bistable element can only be flipped to its other state during a renewed actuation of the ignition switch since the AND-gate 12 is now blocked, as a result a resumption of the vehicular motion after it has been momentarily arrested does not trigger a new testing cycle.

Figure 2:
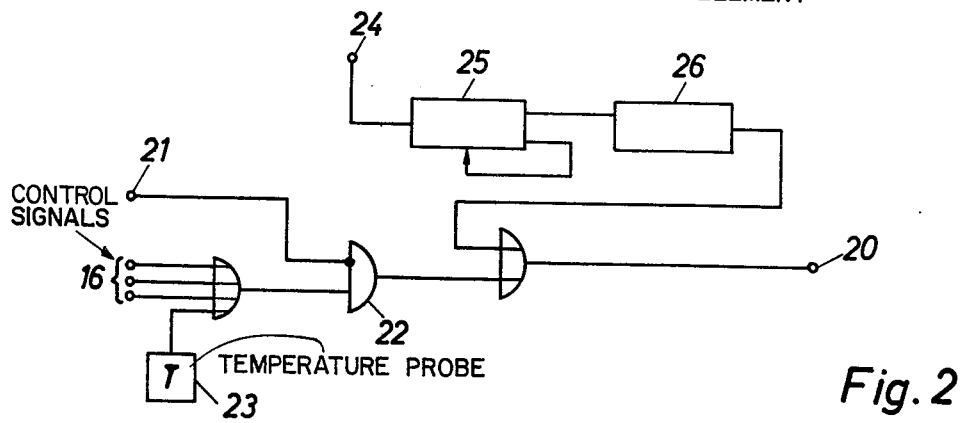
FIG. 2 is a supplemental circuit for use with at least a portion of the exemplary embodiment of FIG. 1.

Supplementary tests can be performed according to the invention. These are triggered by means of the switching circuitry of the exemplary embodiment of FIG. 2. It is to be assumed therein that the terminal 20 is connected in parallel with the output line of the AND-gate 12 of FIG. 1, and a signal in this line accordingly triggers a testing procedure. A triggering signal reaches the terminal 20 when one of the lines 16 carries a signal (control signal), and when the AND-gate 22 is not blocked by means of a signal at terminal 21 generated during braking. A control signal in the lines 16 while the vehicle is not being braked signifies a defect within the anti-lock control system, which condition justifies a test.

A signal from a temperature probe 23 likewise triggers a test. The probe 23 issues a signal whenever a given preset temperature is exceeded. By this means, the effects of temperature can be recognized by the anti-lock control system.

Yet another test is possible. The test is triggered after a delay when first, for example, the reference magnitude of the analyzer circuit 4 (which appears at the terminal 24) exceeds a definite velocity threshold, for example, 25 kilometers/hour, and when, subsequently, the velocity falls to, for example, 10 kilometers/hour. The velocity thresholds are set in the block 25. Exceeding this first threshold contained in the block 25 generates a first output signal which switches the threshold level of the block 25 to the lower value. A falling below the second threshold sends a signal to the timing element 26, which in turn sends a signal to the terminal 20 after the passage of a time delay of sufficient length to bring the velocity of the vehicle under the boundary velocity of the control operation.

To prevent a responding of the valves during such a testing procedure, one can additionally use the signal at the terminal 20 for the blocking of the valves in the block 5.

What is claimed is:

1. A testing apparatus for an anti-lock control system for vehicle brakes, for testing the correct functioning of the control system, the control system including at least one vehicle related speed sensor, which senses an increasing vehicle speed, and means for analyzing the output signal from the speed sensor, the testing apparatus comprising the following switching devices:
    (a) test signal producing means connected to the means for analyzing, for producing a test signal which is delivered to the means for analyzing to initiate a test procedure, said test signal producing means including means for receiving the output of the means for analyzing to determine the correctness of said output; and
    (b) first triggering signal producing means connected to the speed sensor and to the test signal producing means, for producing a triggering signal in response to the output of the speed sensor, when a predetermined speed as sensed by the speed sensor is exceeded, and delivering the triggering signal to the test signal producing means for triggering, said first triggering signal producing means including switch means responsive to actuation of the vehicle ignition switch and responsive to the test signal producing means, thereby ensuring that the test procedure is performed only at the first exceeding of the predetermined speed after the vehicle is initially set into operation.

2. The testing apparatus as defined in claim 1, wherein the speed sensor senses the speed of a vehicle wheel.

3. The testing apparatus as defined in claim 1, wherein the control system includes at least two speed sensors, one adapted to sense the speed of the vehicle front wheels and the other adapted to sense the speed of the vehicle rear wheels.

4. The testing apparatus as defined in claim 1, further comprising:
    (c) a warning device connected to the first triggering signal producing means, said warning device being switched on when the vehicle is initially set into operation and switched off after completion of the testing procedure.

5. The testing apparatus as defined in claim 1, further comprising second triggering signal producing means, for producing a triggering signal in response to a predetermined condition, and delivering the triggering signal to the test signal producing means, the predetermined condition is defined as a control system output signal from the means for analyzing without braking and wherein means for sensing the control system output signal of the means for analyzing and blocking means for blocking the output of the means for sensing and consequently the triggering signal, during a breaking of the vehicle, are provided.

6. The testing apparatus as defined in claim 1, further comprising second triggering signal producing means, for producing a triggering signal in response to a predetermined condition, and delivering the triggering signal to the test signal producing means, wherein the predetermined condition is defined as a predetermined temperature level, and wherein a temperature sensor and blocking means for blocking the output of the temperature sensor and consequently the triggering signal during a braking of the vehicle are provided.

7. The testing apparatus as defined in claim 1, further comprising second triggering signal producing means, for producing a triggering signal in response to a predetermined condition, and delivering the triggering signal to the test signal producing means, wherein the predetermined condition is defined as a decrease of a reference value of the means for analyzing, wherein the means for determining the occurrence of that predetermined condition includes means for establishing two successive threshold levels with the second threshold level being less than the first threshold level, and with the second threshold level being introduced when the first threshold level is equal to the reference value, and wherein a test is initiated after the reference value has fallen below the second threshold level.

* * * * *